United States Patent [19]
Saner

[11] 3,773,125
[45] Nov. 20, 1973

[54] BALANCE WITH TEMPERATURE COMPENSATION

[75] Inventor: Kaspar Saner, Dubendorf, Switzerland

[73] Assignee: Wirth, Gallo & Co., Zurich, Switzerland

[22] Filed: May 9, 1972

[21] Appl. No.: 251,649

[30] Foreign Application Priority Data
July 16, 1971 Switzerland.................. 10474/71

[52] U.S. Cl. .............................................. 177/227
[51] Int. Cl............................................... G01g 3/18
[58] Field of Search .............................. 177/226–230

[56] References Cited
UNITED STATES PATENTS
1,827,048  10/1931  Stimpson et al. ................... 177/227

Primary Examiner—George H. Miller, Jr.
Attorney—Stevens, Davis, Miller & Mosher

[57] ABSTRACT

A temperature-compensated balance comprising a balance pan coupled by motion-transmitting members to a mass providing a counter-moment to a weight placed on the balance pan. A first bimetal strip is coupled between the frame of the balance and the balance pan to provide a zero point temperature compensation substantially independent of the load on the balance pan. A second bimetal strip, having its axis substantially perpendicular to that of the first bimetal strip, is provided to compensate for the steepness of the characteristic of the balance.

9 Claims, 8 Drawing Figures

BALANCE WITH TEMPERATURE COMPENSATION

This invention relates to a balance having a frame a balance pan, motion-transmitting members, and load-compensating means.

It is generally known in balances, to use elements which serve to compensate for variations in the zero point or in the steepness of the balance characteristic. However, the hitherto-known elements have been unsuitable for individual quantitative adjustment.

The invention has the object of providing compensating elements which enable a force or a moment to be exerted on the balance and which permits individual adjustment to be carried out. The result of this is that, not only can a fixed zero point compensation be provided but also an adjustable zero point compensation and an adjustable compensation for the steepness of the balance characteristic.

According to the invention a balance comprises a frame, a balance pan, motion transmitting members, and at least one temperature dependent compensating element, the compensating element comprising a bimetal strip which lies parallel to at least one motion transmitting member, the compensation element being rotatable at least to some extent about its own axis, and means to lock the bimetal strip in its rotated position.

Embodiments of the invention are diagrammatically illustrated in the accompanying drawing, in which -

Figure 1:
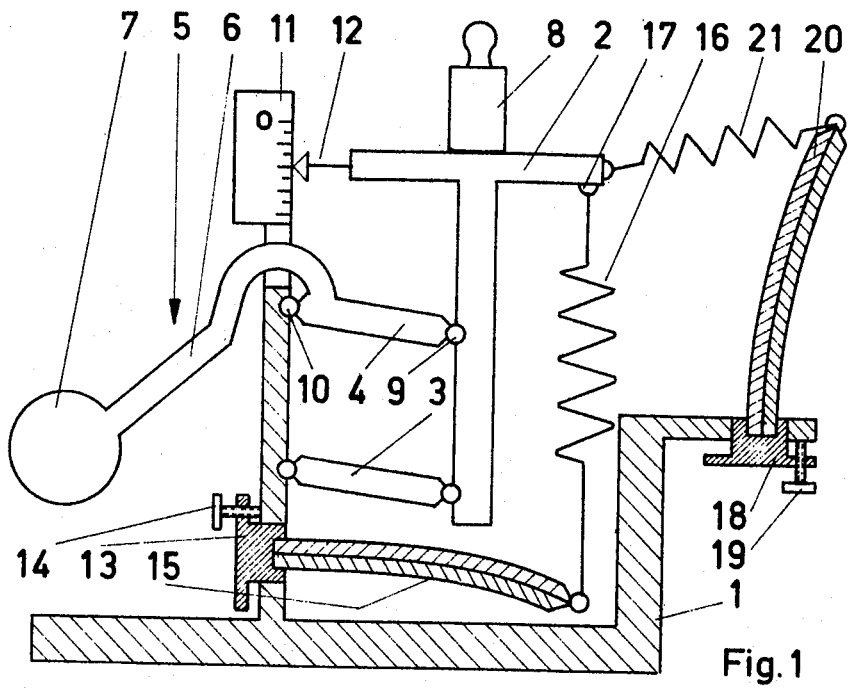
FIG. 1 illustrates a first embodiment of the invention.

FIG. 1 illustrates an inclination balance. This balance comprises a frame 1 on which a balance pan 2 can be guided, in a vertical plane, by means of a guide rod 3 and an arm 4 of the two-arm lever 5, the elements 3 and 4 lying parallel to one another. A load compensating means comprising spherical head 7 is arranged on the second arm 6 of lever 5, the moment of the mass of the spherical head 7 varying with its degree of inclination with respect to its axis 10, so that it serves to balance the counter-moment which is proportional to the mass or object 8 to be weighed. The arrangement in accordance with known practice, is such that the center of gravity of lever 5, together with the object 8 to be weighed, lies substantially below a straight line passing through the two joints 9, 10, associated with the lever 5, with the result that any mass 8, lying within the measuring range of the balance, will attain a position of equilibrium. A scale 11 is arranged on the frame 1 and a pointer 12 on the balance pan 2, so that the magnitude of the mass 8 can be read from the scale for any position of equilibrium of the balance.

A disc 13 is pivotally arranged on the frame 1 and below the guide bar 3. This disc 13 is provided with a screw 14 having a knob by means of which the disc 13 can be retained in any desired position to which it has been rotated. A bimetal strip 15 is so attached to this disc 13 that its longitudinal axis coincides with the axis of rotation of the disc 13. A spring 16 is positioned at the end of the bimetal strip 15, and the other end of this spring is attached to the balance pan 2 at 17. A second disc 18 is rotatably mounted in the frame 1, and is provided with a screw 19 having a knob by means of which the disc 18 can be locked in any desired position. A bimetal strip 20 is fixed to this disc 18 in such manner that its longitudinal axis coincides with the axis of rotation of the disc 18. The end of the bimetal strip 20 is also attached to the balance pan 2 through the intermediary of a spring 21, in such manner that, when the balance is in the unloaded condition, the spring 21 is substantially horizontal, that is to say it exerts a force perpendicular to the axis of spring 16. Thus, the axes of rotation of the two discs 13 and 18 lie approximately perpendicular of each other. The elasticity of the spring 16 is selected to be large in comparison with the yielding properties of the balance mechanism. This means that, for a given load, the alteration in length of the spring would be much greater than the vertical movement of the balance pan relative to the frame of the balance. At reference temperature and for a zero load the spring is unstressed and does not act on the balance. At reference temperature and when the balance pan 2 is subject to loading, the balance pan 2 will lower its position. The spring 16 is compressed and supports a small part of the weight of load 8. The proportion of the weight of the load 8 thus supported by spring 16 is proportional to the ratio of the softness of spring 16 to that of the balance. As mentioned above, it is possible, through the choice of a very soft spring 16, to keep this proportion relatively small. This proportion will, moreover, be taken into account when calibration is being carried out. When the balance pan 2 is empty and when the temperature changes from the reference temperature, then the bimetal strip 15 will bend, for example downwards. The balance pan 2 remains approximately in the position corresponding to zero load. The spring length is extended, and the spring 16 stretched to a certain extent. Thus, this spring 16 applies a small, downwardly-exerted force on the balance pan 2. This force can be precisely controlled by rotating the disc 13. This force remains practically constant over the full weighing range, so that a compensation is realized which is practically independent of load, and which varies proportionately with temperature. It should be noted that this force is transmitted without affecting the position of balance pan 2. This force could possibly be exerted by way of levers of constant motion-transmitting properties; this will be described below in greater detail.

In contrast, the spring 21 is selected to be relatively short and hard. It is horizontally positioned when the balance pan is not subject to loading. This spring 21 is unstressed at reference temperature. When the temperature changes the bimetal strip 20 bends, for example to the right in the drawing, and when the balance pan 2 is subject to loading, the tensioned spring 21 — which now extends obliquely — subjects the balance pan 2 to a load which is proportional to the temperature and to the deflection, and which represents the vertical component of the tensioning force of the spring 21. The magnitude of the vertical component can be controlled by turning the disc 18 to an appropriate extent, and then locking it in the position thus arrived at. It is thus possible to compensate for the steepness of the characteristic of the balance, in a manner which varies as a function of loading and of temperature, and which is carried out independently of the procedure, described above, whereby the zero point is compensated with respect to temperature.

Figure 2:
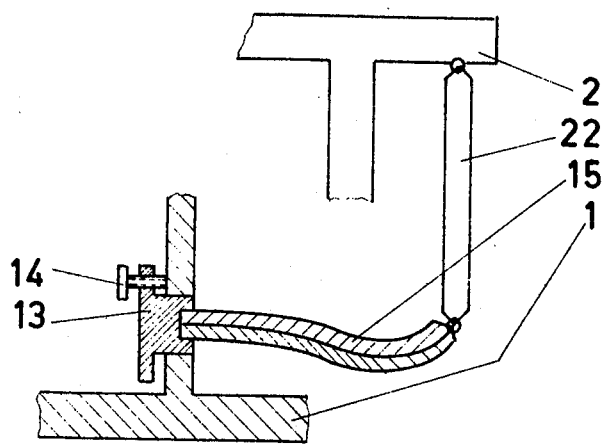
FIG. 2 illustrates a modification of this first embodiment.

FIG. 2 illustrates a modification in which the spring 16 is replaced by a rigid rod 22. In this case a bimetal strip 15 is selected which is itself "soft" with respect to the balance. In other words, there is used, in this modification of the invention, a bimetal strip 15 which, in response to fluctuations in temperature, makes movements which are large in comparison with the movements made by the balance in response to weights placed in the balance pan. However, this bimetal strip 15 can be restored to its original position when subject to loads which are small relative to the maximum loading to which the balance pan is subjected. The result of this is that the bimetal strip 15 causes force to be applied to the balance pan which is proportional to temperature, while the tip or point of this bimetal strip 15 remains approximately at the same height. In this case a bimetal strip 15 is selected whose cross-section has, throughout its length, the approximate shape of an almost round ellipse of inertia. The ratio of the main axes of the ellipse of inertia is, for example, smaller than 3. In the course of rotation of the bimetal strip the useful component of the force of the bimetal strip (which force is proportional to the temperature) alters, although the "softness" of the bimetal strip in the useful direction does not alter. Bimetal strips of this kind are easy to dimension for balances in which the balance pan 2 is only lowered to a very small extent from one end of the weighing range to the other (for example, this alteration may be only a few millimeter or small fractions of a millimeter).

FIGS. 1 and 2 show balances in which the compensating devices act on the balance pan and apply to the latter a force which is a function of temperature.

Balances will be described below, in which at least the device serving to effect zero point compensation acts on a point of a rotatably mounted lever or guide bar of the train of mechanical parts.

Figure 3:
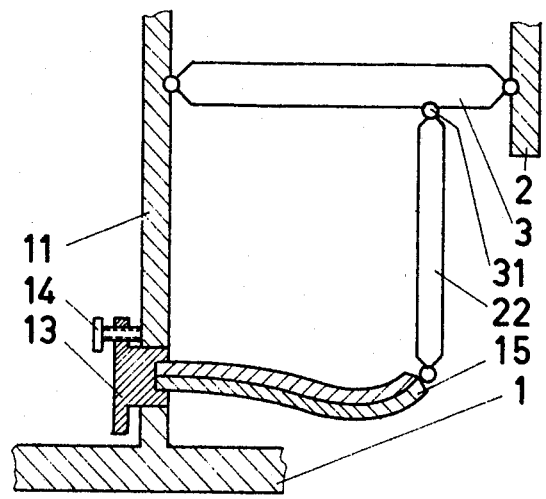
FIG. 3 illustrates a second modification of the first embodiment.

In FIG. 3 the device for effecting zero-point compensation acts on a point 31 of the guide bar 3. The mode of operation of the bimetal strip is in principle the same as in the case of FIG. 2. However, owing to the fact that the compensation force is transmitted from point 31 to the balance pan 2 subject to a step-down ratio, it is easier to realize an arrangement which is sufficiently "soft" with respect to the balance.

The arrangement illustrated in FIG. 1 requires bimetal strips 15 and 20 which, when subjected to extreme temperature fluctuations, are moved through distances which may be multiples of the maximum path of movement of the balance pan. Also, the bimetal strips must be elastically much harder than the springs 16 and 21 arranged upstream of these bimetal strips. In the case of FIGS. 2 and 3, on the other hand, the intrinsic yielding properties of the bimetal strip correspond to the yielding properties of the spring 16 (not used in this form of construction). Thus the necessary volume of the bimetal strip is appreciably reduced.

Figure 4:
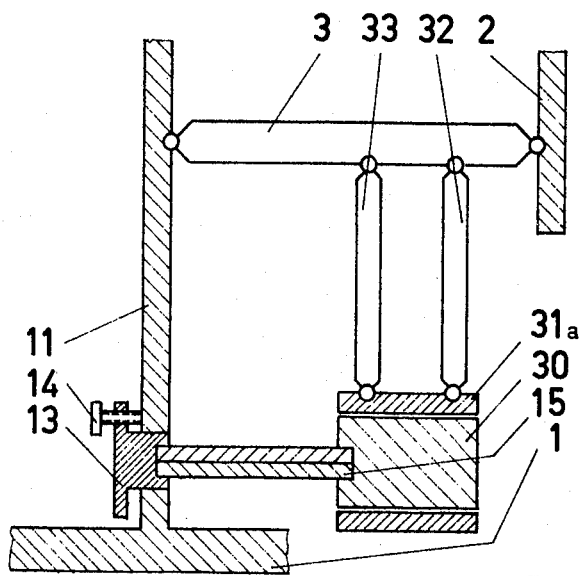
FIG. 4 illustrates a second embodiment of the invention.

The thermal and elastic properties of the bimetal strip can be better exploited if it is introduced between the frame of the balance and a lever or guide bar, and if it is in the form of a beam which is rigidly secured at both ends. In FIG. 4 a bimetal strip 15 is mounted in the frame so as to be pivotable and adjustable as in the case of the arrangements illustrated in FIGS. 1 to 3. After the screw 14 has been tightened, this bimetal strip 15 can be regarded as being clamped in position in frame 1. At its other end the bimetal strip 15 is rigidly connected to an axially arranged cylinder 30, which is mounted without play, or with only small play, in a bore of the ring 31a. This ring 31a is connected to the horizontal guide bar 3 through the intermediary of two vertical guide bars 32, 33, so that no horizontal forces can be transmitted to the guide bar 3. However, vertical forces and moments can be transmitted, via guide bars 32 and 33, to the guide bar 3. However, the bimetal strip is elastically very soft relative to the balance so that, when the movements of the balance are small and at reference temperature, the bimetal strip hardly acts on the balance pan at all. Where temperature fluctuations occur the virtually thermally initiated deformations (arcs) of the bimetal strip are compensated by similar deformations (arcs) which are produced by the reactive moment of the guide bar 3 which, as a first approximation, can be regarded as stationary. This compensating or balancing action takes place everywhere, that is to say in each part section, with the result that the bimetal strip remains straight even if it is also stressed. The bimetal strip does not apply a vertical force to the lever, but only applies a moment which is proportional to the temperature.

The same principle, illustrated in FIG. 4, could also be partially employed if the two guide bars 32 and 33 were to display a certain longitudinal elasticity (longitudinal softness), so that the right-hand end of the bimetal strip would swing and be moved a certain distance.

FIGS. 5, 6, 7 and 8 illustrate practical embodiments of the bimetal strip shown in FIG. 4; in all instances:
 a. the axial rotation of the bimetal strip only takes place between two rotation points 27 and 28, which define a region 25, the rotation being of a plastic nature;
 b. the clamping effect,at effect, at frame and on lever 3, is realised by means of screw connections 24;
 c. it is ensured that horizontal forces will not be exerted by interposing a part of the bimetal strip which is elastic in the longitudinal direction, this part of the bi-metal strip being interposed on the side of the guide bar 3. Naturally, the clamping effect in the lever exhibits a certain rotational softness (FIGS. 5, 6, 7, 8) and a certain vertical softness (FIGS. 6, 7, 8) (corresponding to a model type FIG. 4 with soft guide bars 32, 33). The restrictions may, however, be of a minor nature.

Figure 5:
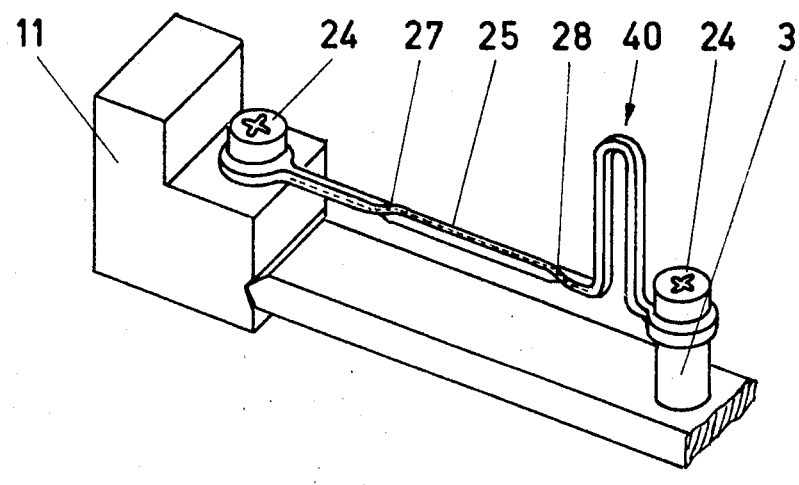
FIGS. 5 to 8 illustrate, on an enlarged scale, different forms of a bimetal strip by means of which the embodiment of FIG. 4 can be realized.
Figure 6:
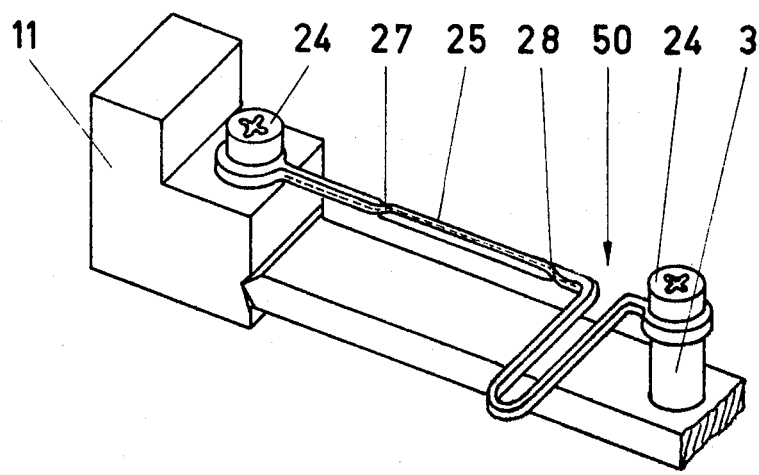
Figure 7:
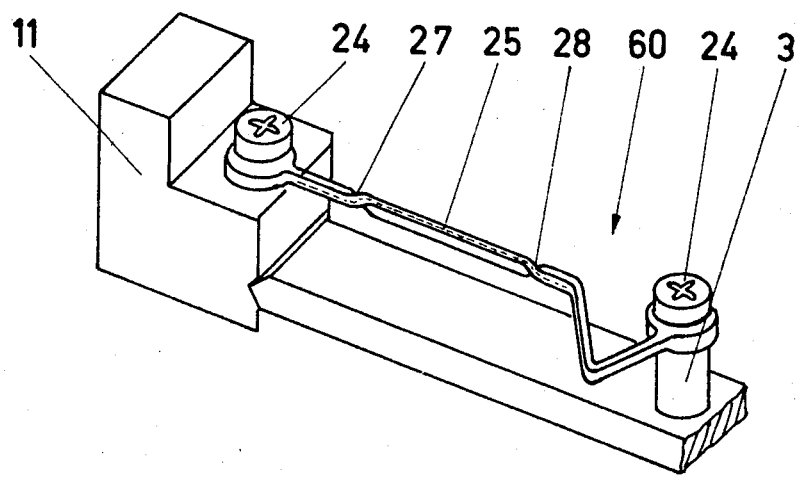
Figure 8:
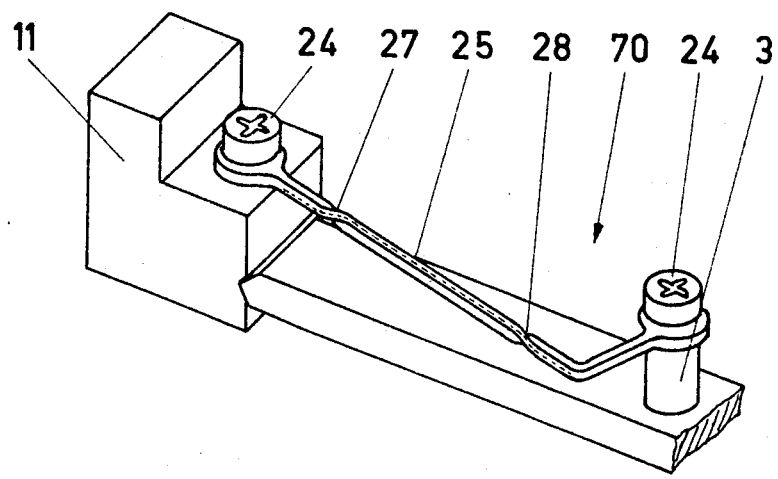

The different forms are distinguished in that:

FIG. 5 exhibits the hardest clamping with respect to vertical forces. Drawback: possibly, the structural height required will be unacceptable;

FIGS. 6, 7, and 8 exhibit a minimal structural height. However, the clamping with respect to vertical forces is softer than is the case with FIG. 5 (all are approximately similar). The choice between the last three embodiments (FIGS. 6 to 8) is determined by considerations of space.

I claim:

1. In a temperature-compensated balance having a frame; a balance pan for receiving an object to be weighed, load compensating means; and motion transmitting members coupling said balance pan to said frame and to said load compensating means, the improvement comprising at least one adjustable temperature dependent compensating element comprising a bimetal strip having one end affixed to said frame and the other end coupled to said balance pan, said bimetal strip acting on said balance pan; and means for locking said temperature compensating element in its adjusted position.

2. A balance according to claim 1 which further comprises a spring coupling the other end of said bimetal strip to said balance pan, said bimetal strip exerting on said balance pan a force in the direction of the movement of said balance pan when an object has been placed thereon.

3. A balance according to claim 1 which further comprises a spring coupling the other end of said bimetal strip to said balance pan, said spring lying substantially perpendicular to the direction of movement of said balance pan and exerting a moment thereon.

4. A balance according to claim 1 which further comprises a rigid rod coupling the other end of said bimetal strip to said balance pan.

5. A balance according to claim 1 which comprises first and second adjustable temperature dependent compensating elements comprising first and second bimetal strips each having one end affixed to said frame, the axis of said first bimetal strip extending substantially perpendicular to the axis of said second bimetal strip, said first bimetal strip exerting on said balance pan a force in the direction of the movement of said balance pan when an object has been placed thereon; first and second springs coupling the other ends of said first and second bimetal strips respectively to said balance pan, said second spring lying substantially perpendicular to the direction of movement of said balance pan and exerting a moment thereon; said first bimetal strip providing zero point temperature compensation substantially independent of the weight of an object on said balance pan and said second bimetal strip compensating for the steepness of the characteristic of said balance.

6. A balance according to claim 1 which further comprises a rotatably mounted body coupling the other end of said bimetal strip to a motion transmitting member.

7. A balance according to claim 6 in which said bimetal strip comprises a main part which is plastically deformable by rotation around its axis, a pair of clamping parts located at the ends of said bimetal strip, and a section interposed between said main part and one of said clamping parts having a greater resilient yielding property in the direction defined by a straight line through said clamping parts than said main part.

8. A balance according to claim 7 in which the cross-section of said bimetal strip throughout its length has an ellipse of inertia which is approximately circular.

9. In a temperature-compensated balance having a frame; a balance pan for receiving an object to be weighed, load compensating means; and motion transmitting members coupling said balance pan to said frame and to said load compensating means, the improvement comprising at least one adjustable temperature dependent compensating element comprising a bimetal strip having one end affixed to said frame and the other end coupled to one of said motion transmitting members, said bimetal strip acting on said one transmitting member; and means for locking said temperature compensating element in its adjusted position.

* * * * *